S. R. Warner,
Pipe Coupling,
N° 33,275. Patented Sep. 10, 1861.
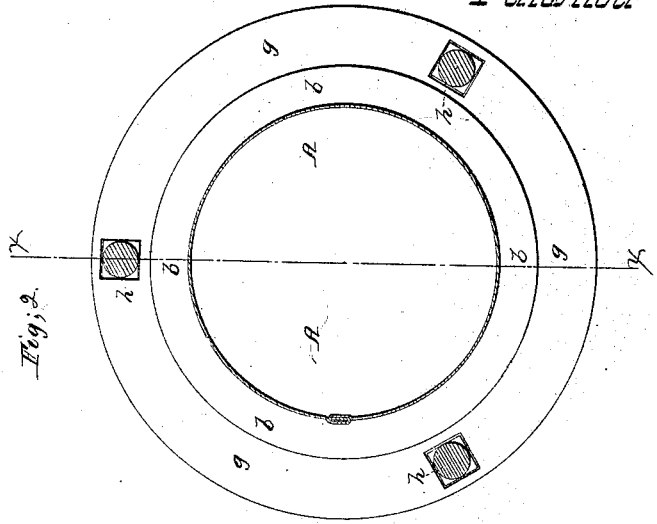
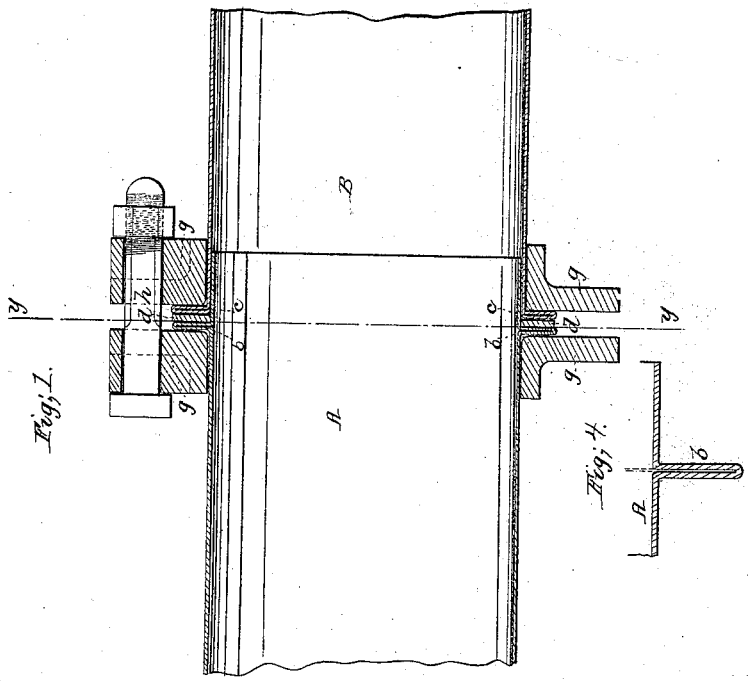
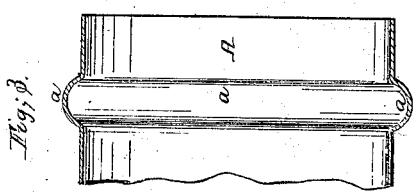
Witnesses:
J. W. Coombs
R. S. Spurrier
Inventor:
S. R. Warner
per Munn & Co.
Attorneys

UNITED STATES PATENT OFFICE.

S. R. WARNER, OF NEW HAVEN, CONNECTICUT.

IMPROVED PIPE-JOINT.

Specification forming part of Letters Patent No. 33,275, dated September 10, 1861.

*To all whom it may concern:*

Be it known that I, S. R. WARNER, of New Haven, in the county of New Haven and State of Connecticut, have invented a new and Improved Method of Making Pipe-Joints; and I do hereby declare that the following is a full, clear, and exact description thereof, reference being had to the accompanying drawings, making a part of this specification, in which—

Figure 1 is a longitudinal section through the ends of a pipe, taken in the plane indicated by red line $x\,x$ in Fig. 2, showing the improved joint. Fig. 2 is a cross-section through Fig. 1 in the plane indicated by red line $y\,y$. Figs. 3 and 4 show the manner of forming the flange on one of the sections of pipe.

Similar letters of reference indicate corresponding parts in the several figures.

My invention refers to a new and improved method of making joints only on thin sheet-metal pipe, and more particularly on tin pipe, which I have employed for conducting the waste or exhaust steam from engines through buildings for warming purposes. The thin sheet-metal pipe is found best adapted to the purpose stated, as it is light and cheap, and with my improved joint it can be made sufficiently tight for all desired purposes.

The invention consists in forming the flanges which are used in uniting the sections of pipe by suitably binding up the pipe metal so that the flanges will be produced from a portion of the pipe, as will be described, instead of making the flanges of separate rings of metal soldered to the pipes, as has been heretofore done in making tight joints on tin pipe.

To enable those skilled in the art to make and use my invention, I will proceed to describe its construction and operation.

A represents one end of a section of pipe, and B represents the end of another pipe, which is united to A by my improved flange-sleeve joint.

In making tight joints on tin pipes which are at the present time used for conducting the waste steam from engines through buildings for warming them, the flanges on the pipe used in making the joint are cut out of pieces of metal in the shape of rings and soldered on the outside of the pipes; but it has been found that these soldered rings or flanges are insecure and frequently break off in making the joints. However, in the expansion and contraction of the pipes the soldered flanges break off and the joints will all more or less leak.

My invention consists in forming the flanges by first swaging up a bead $a$ on the pipe A, as shown in Fig. 3, at a suitable distance from the end thereof, leaving a sleeve portion to enter the end of the pipe B, as shown in Fig. 1 of the drawings. This bead or swelled portion A surrounds the pipe, and it is formed by suitable machinery adapted to the purpose. This bead is now meshed together, and a flange $b$ (shown in Figs. 1, 2, and 4) is produced on the outside of the pipe double the thickness of the pipe metal—tin. This flange is now filled up from the inside with solder, and it is finished.

The flange $c$ on the pipe B is formed on the end of this pipe, as shown in Fig. 1, by swelling out the metal, as before described, and then meshing the portions together so that a flange double the thickness of the pipe metal is produced. This flange $c$ is also filled up with solder, which strengthens or stiffens it. When the flanges on the male and female portions of each section of pipe are thus formed, a ring-packing $d$ of hard rubber is slipped over the sleeve portion of pipe A and brought up against the flange $b$. The pipes are then put together by slipping the sleeve portion of A within the end of B, and thus bringing the two flanges $b$ and $c$ up against the packing $d$. The flanged collars $g\,g$ are now put on each section of pipe A and B and slipped up against the flanges $b$ and $c$, and the joint is completed by bolting the collars $g\,g$ together with the bolts $h\,h\,h$, which operation compresses the packing $d$ and makes a tight joint. Now from this description it will be seen that while the flanges $b\,c$ can be made by suitable machinery very rapidly and for less expense than the soldered flanges before described, they are at the same time much stronger and less liable to tear off than the soldered flanges. A better and tighter fitting joint will therefore be obtained.

Having thus described my invention, what I claim as new, and desire to secure by Letters Patent, is—

The manner herein described and shown of forming a thin sheet-metal pipe-joint—to wit, producing the flanges $b$ and $c$ by bending and swaging up the metal of the pipes, substantially as and for the purposes herein described.

S. R. WARNER.

Witnesses:
A. L. BISHOP,
A. R. TREADWAY.